Sept. 11, 1951  J. A. SAHUTSKI  2,567,787
FISH LURE
Filed Feb. 6, 1950
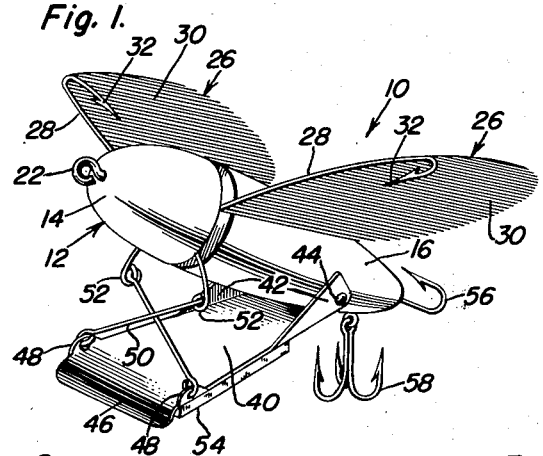
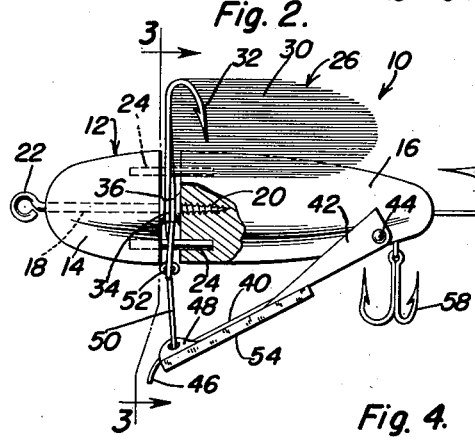
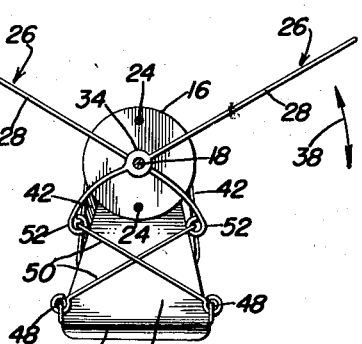
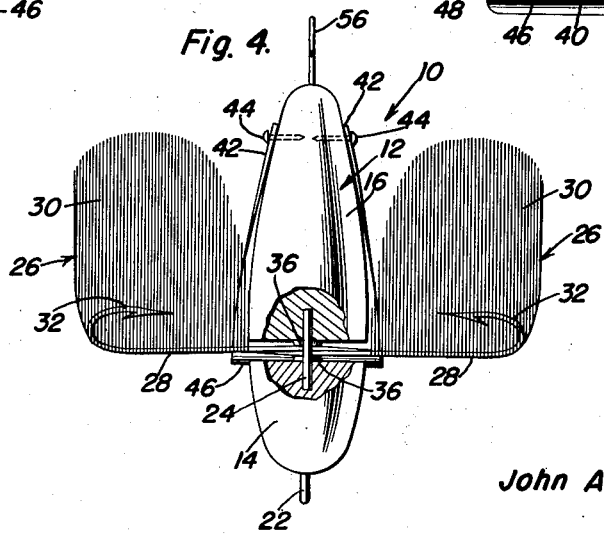
John A. Sahutski
INVENTOR.

Patented Sept. 11, 1951

2,567,787

UNITED STATES PATENT OFFICE 2,567,787.

FISH LURE

John A. Sahutski, Wilkes-Barre, Pa.

Application February 6, 1950, Serial No. 142,629

4 Claims. (Cl. 43—26.2)

This invention relates to new and useful improvements and structural refinements in fish lures, the principal object of the invention being to provide a fish lure consisting of a body having movable elements or members thereon, these elements or members being operatively connected together and one of them being responsive to variations in water pressure so as to cause movement of the other elements, whereby the entire lure may assume the appearance of a winged creature such as a butterfly or the like.

The movable elements or members above mentioned include a pair of wings which are swingably mounted on the body of the lure and a water scoop which is pivotally mounted under the body and is operatively connected to the wings, so that when the lure is smartly tugged or jerked by means of a fishing line, varying water pressure on the scoop motivates the same and the scoop, in turn, transmits its motion to the wings.

Some of the advantages of the invention reside in its simplicity of construction, in its efficient and dependable operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention;

Figure 2 is a side elevational view thereof, the same being partially broken away so as to reveal its construction;

Figure 3 is a transverse sectional view, taken substantially in the plane of the line 3—3 of Figure 2, and Figure 4 is a top plan view of the invention, also partially broken away.

Like characters of reference are employed to designate like parts in the specification and throughout the several views.

Referring now to the accompanying drawings in detail, the invention is embodied in a fishing lure which is designated generally by the reference character 10 and consists of an elongated body 12 composed of two spaced, complemental sections, namely, the front section 14 and the rear section 16, these sections being disposed in tandem and being rigidly connected together in spaced relation by an axial pin 18 which is screw-threaded as at 20 into the body section 16 and extends through the front section 14, terminating at its forward end in an eye 22, whereby the entire lure may be connected to a fishing line. In addition, a pair of dowel pins 24, disposed above and below the pin 18 as shown in Figure 3, may be used for connecting the two body sections together.

A pair of upwardly and downwardly swingable wings 26 are provided at opposite sides of the body 12, each consisting of a supporting rod 28 having suitably attached thereto a wing panel 30 and provided at its upper end with a fish hook member 32 which is embedded in the wing panel, substantially as shown.

The panels of the two wings are preferably formed from transparent material and the supporting rods 28 of the two wings are disposed in crossed relation and are provided intermediate the ends thereof with flat eye pieces 34 so that they may be pivotally mounted on the pin 18 in the space between the body sections 14, 16. Suitable washers or spacers 36 are provided on the pin 18 at the opposite sides of the eye pieces 34, it being apparent from the foregoing that by virtue of this arrangement the wings 26 may be swung upwardly and downwardly, as indicated at 38 in Figure 3.

An elongated water scoop 40 extends longitudinally under the body 12 and is provided at the opposite side edges of its rear portion with upturned flanges 42 which are pivotally attached as at 44 to the rear body section 16, the front portion of the scoop 40 being equipped with a downturned lip 46 and with a pair of upturned ears 48 which are apertured for connection to suitable eyes provided at the ends of a pair of crossed links 50.

The upper ends of the links 50 are provided with additional eyes for connection to similar eyes 52 provided at the lower ends of the respective support rods 28, it being apparent that when the scoop 40 is swung upwardly about the pivot elements 44 the wings 26 will be swung downwardly, and vice versa.

A substantially flat float 54, such as for example, a piece of cork, may be secured to the underside of the scoop 40 so as to urge the same to its upwardly swung position, and finally, it is to be noted that additional fish hooks 56, 58 may be provided on the body section 16, if so desired.

When the invention is placed in use, and the eye 22 is connected to a fishing line, smart tugging or jerking of the fishing line will create rearward pressure of water on the scoop 40, whereby the scoop will be swung downwardly and the wings 28 lifted, but as soon as the tugging or jerking is discontinued, the float 54 will cause the scoop to swing toward the underside of the body, thus lowering the wings. Lifting and lowering of the wings will take place each time the fishing line is tugged, and it will be apparent that by repeatedly tugging the line, the wings of the lure will be subjected to successive oscillations, so that the lure will simulate the appearance of a butterfly or a similar insect.

It is believed that the advantages and use of the invention will be clearly understood from the foregoing disclosure and, accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a fish lure, the combination of an elongated body, a pair of upwardly and downwardly swingable wings pivoted to said body and extending to opposite sides thereof, an elongated water scoop extending longitudinally under said body and pivoted at its rear end to the body for upward and downward swinging movement, and means operatively connecting said wings to the forward end of said scoop.

2. In a fish lure, the combination of an elongated body consisting of a pair of spaced complemental sections disposed in tandem and a longitudinally extending pin securing said sections together, a pair of upwardly and downwardly swingable wings provided at the relatively opposite sides of said body and each including a supporting rod pivotally mounted on said pin, an elongated water scoop extending longitudinally under said body and pivoted at its rear end to the body for upward and downward swinging movement, and a pair of links extending from the front end portion of said scoop to the respective rods of said wings for operatively connecting the same together.

3. The device as defined in claim 2, together with upturned flanges provided at the opposite side edges of the rear end portion of said scoop, and pivot elements connecting said flanges to the rear section of said body.

4. The device as defined in claim 2, together with a float secured to the underside of said scoop.

JOHN A. SAHUTSKI.

REFERENCES CITED

The following references are of record in the file of this patent:

UNITED STATES PATENTS

| Number | Name | Date |
|---|---|---|
| 588,729 | Harris | Aug. 24, 1897 |
| 766,638 | Martin | Aug. 2, 1904 |
| 1,031,623 | Colombier | July 2, 1912 |
| 1,155,883 | Burkman | Oct. 5, 1915 |
| 1,441,059 | Brown | Jan. 2, 1923 |
| 2,235,331 | Pugh | Mar. 18, 1941 |
| 2,413,418 | Rulison | Dec. 31, 1946 |